United States Patent [19]

Sawai et al.

[11] Patent Number: 4,977,359
[45] Date of Patent: Dec. 11, 1990

[54] SERVO MOTOR SYSTEM REQUIRING A REDUCED NUMBER OF SIGNAL TRANSMISSION LINES

[75] Inventors: Kenji Sawai, Nagaokakyo; Tuneto Takeuchi; Jinichi Ito, both of Komagane, all of Japan

[73] Assignees: Omron Tateisi Electronics Co., Kyoto; Kabushiki Kaisha Sankyo Seiki Seisakusho, Nagano, both of Japan

[21] Appl. No.: 440,694

[22] Filed: Nov. 24, 1989

[51] Int. Cl.$^5$ ............................................. G05B 13/00
[52] U.S. Cl. .................................... 318/561; 318/803; 318/721; 318/572
[58] Field of Search ............... 318/561, 563, 564, 571, 318/572, 803, 721

[56] References Cited
U.S. PATENT DOCUMENTS

4,618,810 10/1986 Hagerman ........................... 318/803
4,713,593 12/1987 Rodi et al. ........................... 318/572

Primary Examiner—Bernard Roskoski
Assistant Examiner—Saul M. Bergmann
Attorney, Agent, or Firm—Foley & Lardner, Schwartz, Jeffery, Schwaab, Mack, Blumenthal & Evans

[57] ABSTRACT

In a servo motor system, consisting of a servo motor unit, a servo driver unit, power transmission lines for supplying electric power from the servo driver unit to the servo motor unit, and signal transmission lines for supplying electric signals from the servo motor unit to the servo driver unit, to the end of reducing the number of the signal transmission lines without requiring any particularly high-speed or high-quality signal transmission lines, the servo motor unit comprises a parallel-serial signal conversion circuit for converting outputs from a pole sensor, a rotary encoder, and an abnormal condition sensor into a single serial signal which is transmitted to the servo driver unit via one of the signal transmission lines. The servo driver unit comprise a serial-parallel signal conversion circuit for separating from the serial signal the aforementioned outputs from the various sensors. By suitable logical combination of the parallel signals, the number of bits required for the transmission of the serial signal can be reduced.

9 Claims, 11 Drawing Sheets

SERVO MOTOR SYSTEM REQUIRING A REDUCED NUMBER OF SIGNAL TRANSMISSION LINES

TECHNICAL FIELD

The present invention relates to a servo motor system in which various signals containing information on the state of the servo motor are transmitted from a servo motor unit to a servo driver unit, and, in particular, to such a servo motor system which requires a reduced number of signal transmission lines in its signal transmission system.

BACKGROUND OF THE INVENTION

Figure 10:
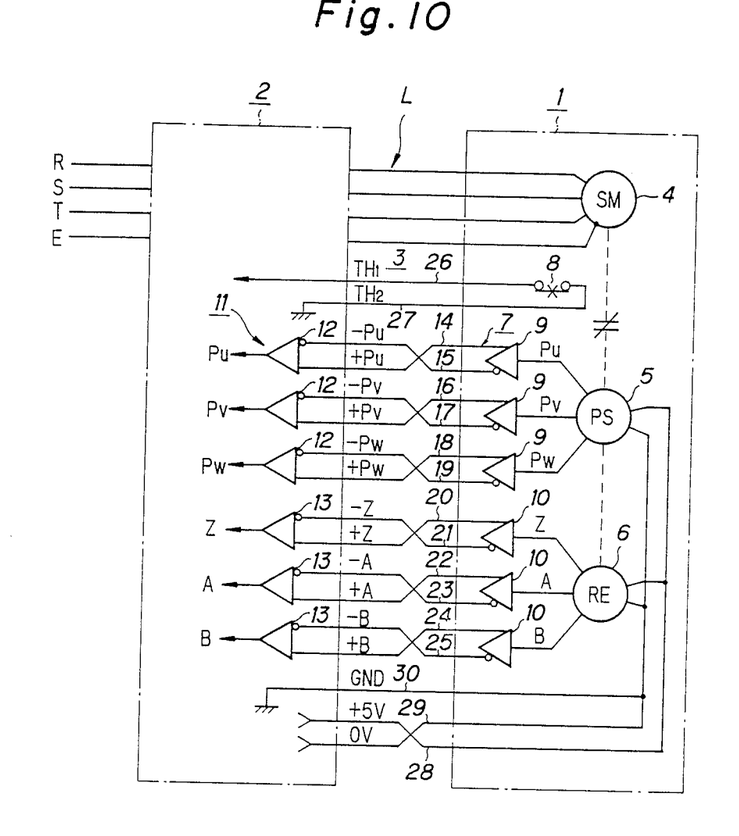
FIG. 10 is a circuit diagram similar to FIG. 1 showing a related art servo motor system.
Figure 11:
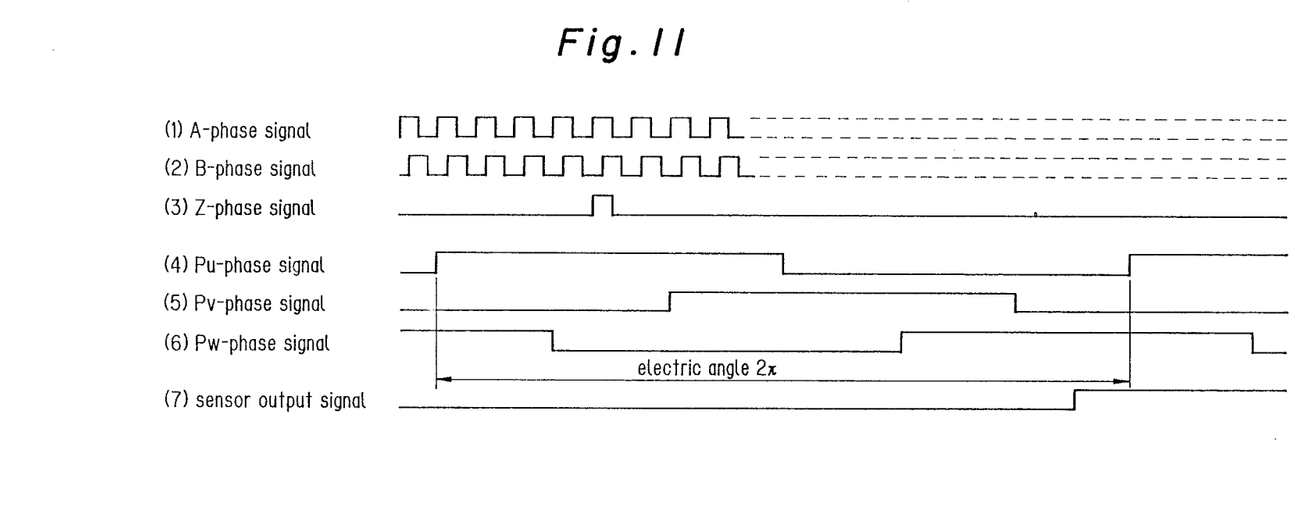
FIG. 11 is a time chart of the servo motor system given in FIG. 10.

FIG. 10 shows an example of conventional servo motor system consisting of a servo motor unit 1, a servo driver unit 2, power lines L for supplying controlled electric power from the servo driver unit 2 to the servo motor unit 1, and signal transmission lines 3 for supplying signals related to the state of the servo motor unit 1 from the servo motor unit 1 to the servo driver unit 2, and FIG. 11 shows the changes in the signals supplied from the servo motor unit 1 to the servo driver unit 2.

The servo motor unit 1 comprises a servo motor 4, a pole sensor 5 and a rotary encoder 6 incorporated in the servo motor 4, a signal transmission circuit unit 7, and a temperature sensor 8 for detecting any abnormal temperature rise in the servo motor unit 1. The signal transmission circuit unit 7 comprises three line drivers 9 for sending out a Pu-phase signal, a Pv-phase signal and a Pw-phase signal obtained by the pole sensor 5, and additional three line drivers 10 for sending out a Z-phase signal, an A-phase signal and a B-phase signal obtained by the rotary encoder 6. These line drivers 9 and 10 are connected to associated line receivers 12 and 13 provided in the servo driver unit 2 via signal lines 14 through 25 constructed as balanced signal transmission lines. The signal lines 14 through 25 include six signal lines 14 through 19, or the +Pu, −Pu, +Pv, −Pv, +Pw and −Pw lines, for transmitting the Pu-phase, Pv-phase and Pw-phase signals, additional six signal lines 20 through 25, or the +X, −X, +Y, −Y, +Z and −Z lines, for transmitting the Z-phase, A-phase and B-phase signals, a pair of lines 26 and 27, or the $T_{H1}$ and $T_{H2}$ lines, for transmitting a temperature signal from the temperature sensor 8, and lines 28 through 30, or GND, +5V and 0V lines, serving as +5, +0 and ground lines. In FIG. 10, R, S, T and E denote power lines for supplying three-phase AC power.

Thus, according to this three-phase servo motor system, 17 lines are required in addition to the power lines L, and a considerable amount of work is required to perform necessary wire connections. Furthermore, each wire for the 17 signal lines must have a small diameter in order to control the overall diameter of the cable incorporating these signal lines, and this increases the risk of wire breakage. Also, the costs required for connectors contributes to the increase in the overall cost of the servo motor system.

Suppose that the rotary encoder 6 produces 5,000 pulses as A-phase and B-phase signals for each revolution, and the servo motor 4 rotates at 1,800 rpm. The frequency of the A-phase and B-phase signals is 150 kHz, and the phase different between the A-phase and B-phase signals is 1 microseconds in the worst case. Therefore, the quality of the signal lines must be correspondingly high to be able to transmit signals of such high speed. Therefore, it may be conceivable in theory to transmit various signals as a serial signal transmission process through signal lines of a smaller number, but the need for extremely high speed signal transmission lines has prevented it from being accomplished.

BRIEF SUMMARY OF THE INVENTION

In view of such problems of the related art of this invention, the inventors have studied the possibility of transmitting only those signals which are not required to be very high in speed, such as the Pu-phase, Pv-phase and Pw-phase signals produced by the pole sensor 5 and the Z-signal line from the rotary encoder 6, and the temperature signal from the temperature sensor 8, by serial signal transmission.

For instance, when the servo motor 4 is an eight-pole motor, and its rotational speed is 3,600 rpm, its synchronization frequency will be 240 Hz, and the electric angle $2\pi$ (pi) between the Pu-phase, Pv-phase and Pw-phase signals will be approximately 4.17 milliseconds. Therefore, a delay in the order of 11 microseconds would be permissible in the transmission speed of the Pu-phase, Pv-phase and Pw-phase signals to achieve a resolution capability in the order of one degree.

As for the Z-phase signal of the rotary encoder 6 which is used for locating the mechanical datum of the system, it is necessary to reduce the rotational speed of the servo motor 4 in order to accurately locate the datum. Typically, the rotational speed of the servo motor at such a time is 1/50 to 1/200 of the maximum rotational speed. If the rotary encoder 6 is capable of producing 2,000 pulses per revolution, the pulse width of the Z-phase signal will be 180 microseconds, and the transmission speed for the Pu-phase, Pv-phase and Pw-phase signals will be sufficient for the Z-phase signal.

As for the temperature signal, there is no problem in the speed of signal transmission.

Thus, a primary object of the present invention is to provide a servo motor system which can reduce the number of signal lines connected between a servo motor unit and a servo driver unit, without affecting the performance of the servo motor system.

A second object of the present invention is to provide a servo motor system which can reduce the number of signal lines without requiring any special high speed signal transmission lines.

These and other objects of the present invention can be accomplished by providing a servo motor system, consisting of a servo motor unit, a servo driver unit, power transmission lines for supplying electric power from the servo driver unit to the servo motor unit, and signal transmission lines for supplying electric signals from the servo motor unit to the servo driver unit, wherein: the servo motor unit comprises: a servo motor; a pole sensor for detecting a magnetic state of the motor main body; a rotary encoder for detecting a mechanical state of the servo motor; a parallel-serial signal conversion circuit for converting an output from the pole sensor and an output from the rotary encoder into a single serial signal; and a line driver for sending out the serial signal through one of the signal transmission lines: and the servo driver unit comprises: a line receiver for receiving the serial signal transmitted from the line driver through the signal transmission line; a serial-parallel signal conversion circuit for separating the output signals from the rotary encoder and the pole sensor from the serial signal, and a controller for controlling supply of electric power to the servo motor unit through the power transmission lines according to the separated parallel signals. Typically, the servo motor consists of a three-phase AC motor, and the outputs from the pole sensor and the rotary encoder include Pu-phase, Pv-phase and Pw-phase signals from the pole sensor and a Z-phase signal from the rotary encoder.

Thus, since the Z-phase signal from the rotary encoder, the polarity detection signals from the pole sensor, and the sensor output signal from the motor abnormal detection signal are transmitted as a serial signal through the signal transmission lines, a significant reduction in the number of the lines in the signal transmission lines can be effected without requiring any unduly high quality signal transmission lines.

According to a preferred embodiment of the present invention, the servo motor unit further comprises a motor abnormal condition sensor for detecting an abnormal condition of the servo motor unit, and an output signal from the motor abnormal condition sensor is supplied to the parallel-serial signal conversion circuit to be included in the serial signal and to be separated from the serial signal by the serial-parallel signal conversion circuit in the servo driver unit.

According to a particularly preferred embodiment of the present invention, the number of bits contained in the serial signal can be reduced by two bits by providing that a driver logic circuit comprising three AND circuits is connected to the input ends of the parallel-serial signal conversion circuit, the Pu-phase, Pv-phase and Pw-phase signals being each supplied to an input end of associated one of the AND circuits whose other ends are commonly connected to receive the sensor output signal while the Z-phase signal is directly supplied to one of the inputs of the parallel-serial signal conversion circuit; and a motor logic circuit comprising a NOR circuit is connected to the output ends of the serial-parallel signal conversion circuit, detected Pu-phase, Pv-phase and Pw-phase signals separated from the serial-parallel signal conversion circuit being supplied to different input ends of the NOR circuit so as to produce a detected abnormal condition signal from an output end of the NOR circuit in case an abnormal condition is detected by the abnormal condition sensor while a detected Z-phase signal is directly obtained from one of the output ends of the serial-parallel signal conversion circuit.

A reduction of one bit from the number of bits required for the serial signal can be achieved with a relatively simple circuit by providing that a driver logic circuit comprising one AND circuit and three OR circuits is connected to the input ends of the parallel-serial signal conversion circuit, the Pu-phase signal and the Z-phase signal being supplied to different input ends of the AND circuit while an output of the AND circuit, and the Pv-phase and Pw-phase signals are each supplied to an input end of associated one of the OR circuits whose other ends are commonly connected to receive the sensor output signal; and a motor logic circuit comprising a NOR circuit, an AND circuit and an OR circuit is connected to the output ends of the serial-parallel signal conversion circuit, three outputs from the serial-parallel signal conversion circuit being connected to different inputs of the NOR circuit as well as to different inputs of the AND circuit while an output of the NOR circuit and one of the output ends of the serial-parallel signal conversion circuit being connected to different inputs of the OR circuit so that a detected Z-phase signal, a detected Pu-phase signal and a detected sensor output signal may be obtained from the output end of the NOR circuit, an output end of the OR circuit and an output end of the AND circuit, respectively, while detected Pv-phase and Pw-phase signals may be obtained directly from associated ones of the output ends of the serial-parallel signal conversion circuit.

To even further reduce the number of the signal transmission lines, the servo motor unit may comprise: a three-phase AC servo motor; a pole sensor for detecting magnetic state of the servo motor and supplying Pu-phase, Pv-phase and Pw-phase signal; a rotary encoder for detecting a mechanical state of the servo motor and supplying a Z-phase signal; a first parallel-serial signal conversion circuit for converting the Pu-phase, Pv-phase and Pw-phase signals from the pole sensor and the Z-phase signal from from the rotary encoder into a first serial signal; a second parallel-serial signal conversion circuit for converting the first serial signal and A-phase and B-phase signals from the rotary encoder into a second serial signal; and a line driver for sending out the second serial signal through one of the signal transmission lines: while the servo driver unit may comprise: a line receiver for receiving the second serial signal transmitted from the line driver through the signal transmission line; a first serial-parallel signal conversion circuit for separating, from the second serial signal, a detected serial signal and detected A-phase and B-phase signals; a second serial-parallel signal conversion circuit for separating, from the detected first serial signal, detected Pu-phase, Pv-phase, Pw-phase and Z-phase signals, and a controller for controlling supply of electric power to the servo motor unit through the power transmission lines according to the separated parallel signals.

BRIEF DESCRIPTION OF THE DRAWINGS

Now the present invention is described in the following in terms of specific embodiments with reference to the appended drawings, in which.

DETAILED DESCRIPTION OF THE PREFERRED EMBODIMENTS

Figure 1:
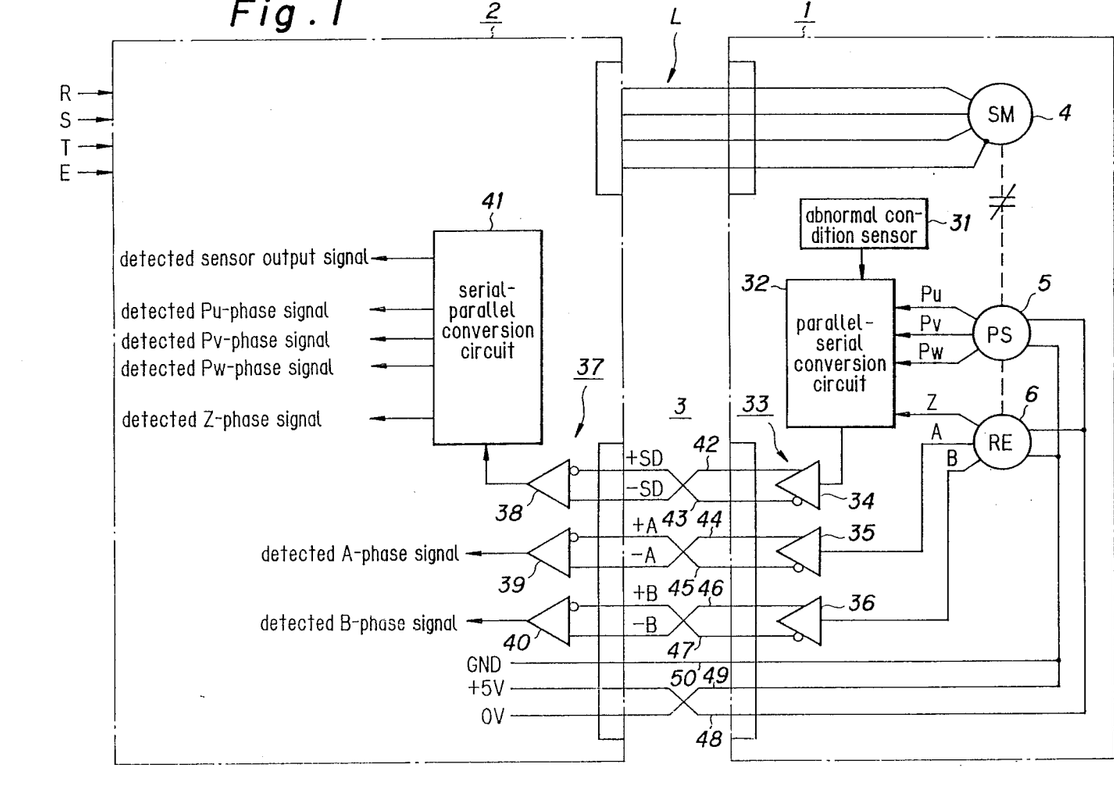
FIG. 1 is a circuit diagram of a servo motor system according to a first embodiment of the present invention.

FIG. 1 shows a servo motor system according to a first embodiment of the present invention. A servo motor unit 1 is connected to a servo driver unit 2 via a plurality of signal transmission lines 3. The servo motor unit 1 includes a servo motor 4, a pole sensor 5 and a rotary encoder 6 which are mechanically coupled with the servo motor 4, an abnormal condition sensor 31, a parallel-serial signal conversion circuit 32, and a signal transmission circuit unit 33.

The pole sensor 5 detects the angular position of the magnetic poles in the servo motor 4 and supplies three-phase magnetic pole signals, or Pu-phase, Pv-phase and Pw-phase signals, to the parallel-serial signal conversion circuit 32. The rotary encoder 6 is of an incremental type, and supplies A-phase and B-phase signals to line drivers 35 and 36 of the signal transmission circuit unit 33 and a Z-phase signal to the parallel-serial signal conversion circuit 32. The abnormal condition sensor 31 detects an abnormal condition of the servo motor 4, for instance an abnormal temperature increase thereof, and supplies a sensor output signal to the parallel-serial signal conversion circuit 32.

Figure 2:
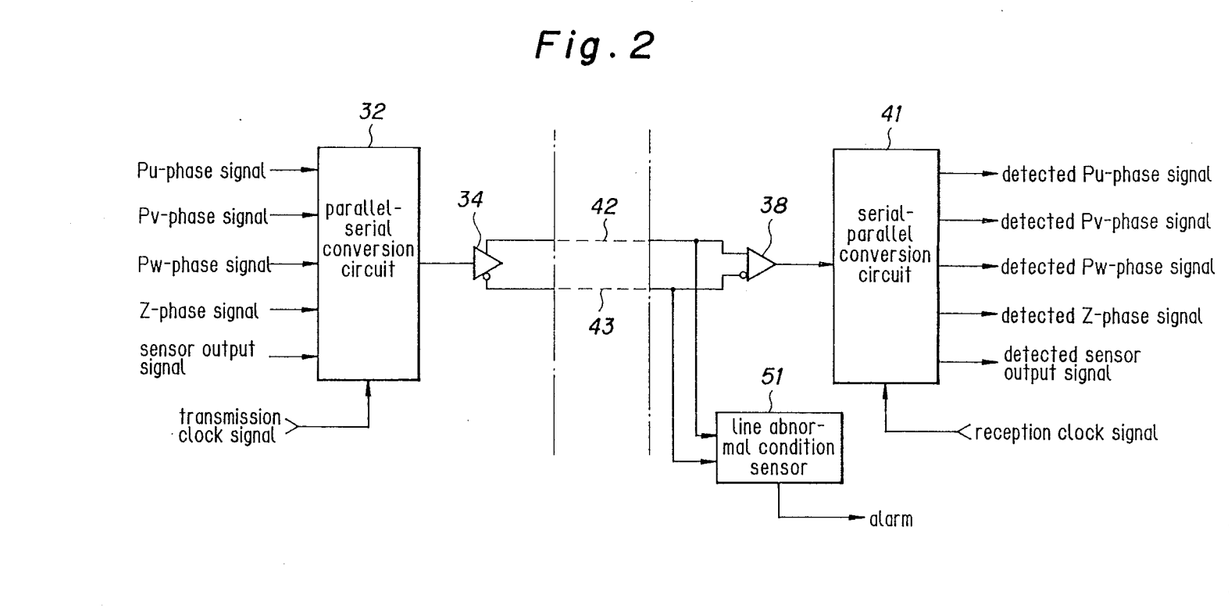
FIG. 2 is a circuit diagram of a part of the system shown in FIG. 1.

The parallel-serial signal conversion circuit 32 receives the Pu-phase, Pv-phase and Pw-phase signals, the Z-phase signal and the sensor output signal, and converts them into a corresponding serial signal which is given to the line driver 34 of the signal transmission circuit unit 33, as shown in FIGS. 1 and 2.

The signal transmission lines 3 include six signal lines 42 through 47 for supplying the A-phase and B-phase signals +A, −A, +B and −B, and the serial signal +SD and −SD, and three additional lines for supplying +5-volt and +0-volt power with the remaining line serving as a ground line GND. Therefore, as compared with the 17 signal lines used in the device of FIG. 10, a considerable reduction in the number of signal lines is accomplished.

The servo driver unit 2 includes a signal receiver circuit unit 37, a serial-parallel signal conversion circuit 41 and so on. The signal receiver circuit unit 37 includes three line receivers 38 through 40 for receiving the A-phase and B-phase signals and the serial signal, with the serial signal being supplied to the serial-parallel signal conversion circuit 41 via the line receiver 38. The serial-parallel signal conversion circuit 41 converts the serial signal into the original parallel signals, and sends out the Pu-phase, Pv-phase and Pw-phase signal, the Z-phase signal and the sensor output signal. As shown in FIG. 2, there is provided a line abnormal condition detecting circuit 51 for detecting abnormal conditions of the signal transmission lines, such as line breakage, and issues a warning as required.

Figure 3:
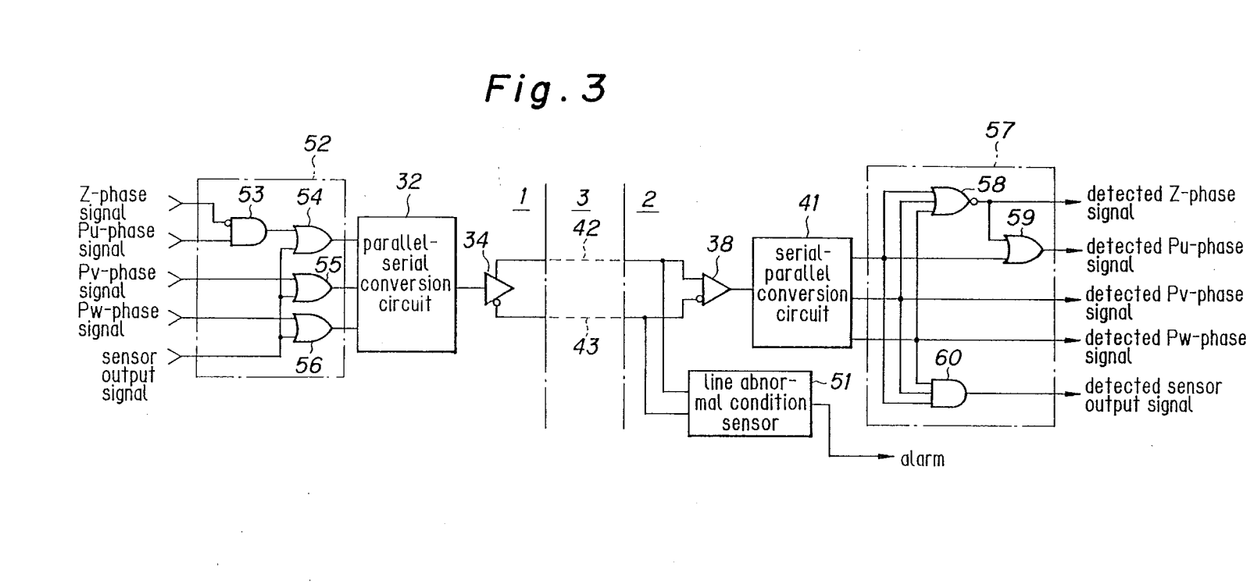
FIG. 3 is a circuit diagram showing a second embodiment of the present invention.
Figure 4:
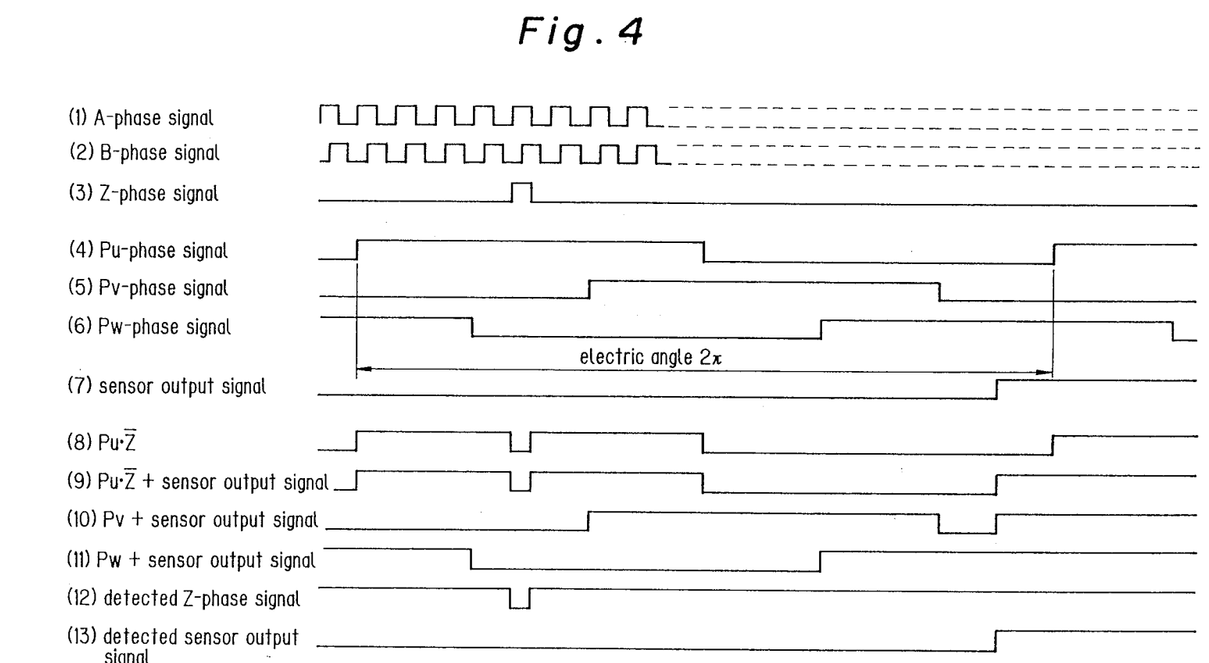
FIG. 4 is a time chart of the second embodiment.

FIG. 3 shows a second embodiment of the present invention, and FIG. 4 shows a time chart of this embodiment.

This embodiment is based on the fact that the logical multiplication of the Pu-phase, Pv-phase and Pw-phase signals is always zero (or Pu.Pv.Pw=0), that their logical sum is always 1(Pu+Pv+Pw=1), and that these results are not affected even when the Z-phase signal is added thereto. When the sensor output signal is turned on, the logical state is turned into a reversed state, thereby reducing the size of the signal to be transmitted by two bits. Should there arise any abnormal condition of the servo motor 4, the servo motor 4 is turned off without any reservation, and the absence of the Pu-phase, Pv-phase, Pw-phase, and Z-phase signals would not create any practical problems.

Referring to FIG. 3, the servo motor unit 1 is provided with a logic circuit 52 including an AND circuit, and three OR circuits 54 through 56, and the logic circuit 52 receives the Z-phase signal (FIG. 4(3)), the Pu-phase signal (FIG. 4(4)), the Pv-phase signal (FIG. 4(5)), the Pw-phase signal (FIG. 4(6)), and the sensor output signal (FIG. 4(7)). The Z-phase signal is produced when the Pu-phase signal is "1" and the Pv-phase signal and the Pw-phase signal are both "0", and the result of a logical multiplication between an inverted Z-phase signal and the Pu-phase signal (Pu Z) is obtained from the output of the AND circuit 53 (FIG. 4(8)). A logical sum of the output of the AND circuit 53 and the sensor output signal (Pu.$\bar{Z}$+sensor signal) is produced from the output of the OR circuit 54; a logical sum of the Pv-phase signal and the sensor output signal (Pv+sensor output signal) is obtained from the output of the OR circuit 55; and a logical sum of the Pw-phase signal and the sensor output signal (Pw+sensor output signal) is obtained from the output of the OR circuit 56. These logical sum outputs ((9) through (11) of FIG. 4) are converted into a serial signal by the parallel-serial signal conversion circuit 32, and this serial signal is supplied to the servo driver unit 2 via the line driver 34 of the signal transmission circuit unit 33 and the signal transmission lines.

The servo driver unit 2 receives this serial transmission signal at its line receiver 38, converts it into parallel signals with a serial-parallel signal conversion circuit 41, and supplies the parallel signals to a logic circuit 57.

The logic circuit 57 comprises a NOR circuit 58, an OR circuit 59, and an AND circuit 60. The NOR circuit 58 receives the demodulated logical sum signals (Pu.$\bar{Z}$+sensor signal), (Pv+sensor output signal), and (Pw+sensor output signal), and produces a detected Z-phase signal (FIG. 4(12)), and the OR circuit 59 receives the output of the NOR circuit and the logical sum signal (Pu.$\bar{Z}$+sensor output signal) and produces a detected Pu-phase signal. On the other hand, the logical sum signals (Pv+sensor output signal) and (Pw+sensor output signal) are simply used as a detected Pv-phase signal and a detected Pu-phase signal, respectively. The AND circuit 60 receives the logical sum signals (Pu.$\bar{Z}$+sensor output signal), (Pv+sensor signal), and (Pw+sensor output signal), and produces a detected abnormal condition signal when the logical product of the three inputs is found to be "1" (FIG. 4(13)).

Figure 5:
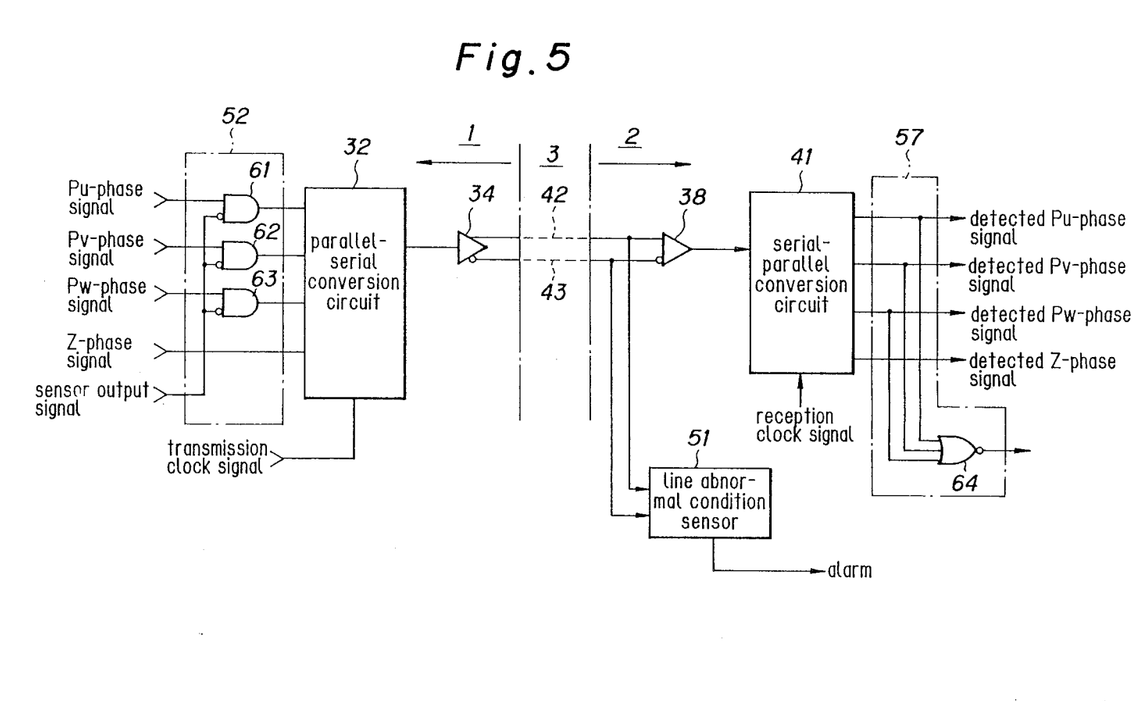
FIG. 5 is a circuit diagram showing a third embodiment of the present invention.

FIG. 5 shows a third embodiment of the present invention, in which the logical circuit 52 of the servo motor unit 1 consists of three AND circuit 61 through 63, and the logical circuit 57 of the servo driver unit 2 consists of a single NOR circuit 64. According to this embodiment, the structures of the logic circuits 52 and 57 are more simplified than those of the previous embodiment, but the serial transmission signal consists of four bits and thus requires one more bit for data transmission.

When the servo motor unit 1 is activated, the A-phase and B-phase signals of the rotary encoder 6 are transmitted directly to the line drivers 35 and 36 of the signal transmission circuit unit 33, but the Z-phase signal of the rotary encoder 6, the Pu-phase, Pv-phase and Pw-phase signals of the pole sensor 5, and the sensor output signal of the abnormal condition sensor 31 are supplied to the parallel-serial signal conversion circuit 32 to be converted into a serial signal, and is further supplied to the line driver 34 of the signal transmission circuit unit 33. The serial signal and the A-phase and B-phase signals are supplied from the line drivers 34 through 36 to the servo driver unit 2 via the signal transmission lines 3, and are finally received by the line receivers 38 through 40 of the signal receiver circuit unit 37 where the serial signal is converted into parallel signals to produce the detected Pu-phase, Pv-phase and Pw-phase signals, the detected Z-phase signal, and the detected abnormal condition signal.

Thus, according to the above described embodiments, since the Z-phase signal of the rotary encoder, the polarity detection signals from the pole sensor, and the sensor output signal from the motor abnormal condition detection sensor are transmitted as a serial signal through the signal transmission lines, a significant reduction in the number of the lines in the signal transmission lines can be effected without requiring any unduly high quality signal transmission lines. Furthermore, the number of bits which are required to be transmitted can be reduced by a favorable arrangement of the logic circuits in association withe the parallel-serial and serial-parallel signal conversion circuits.

Figure 6:
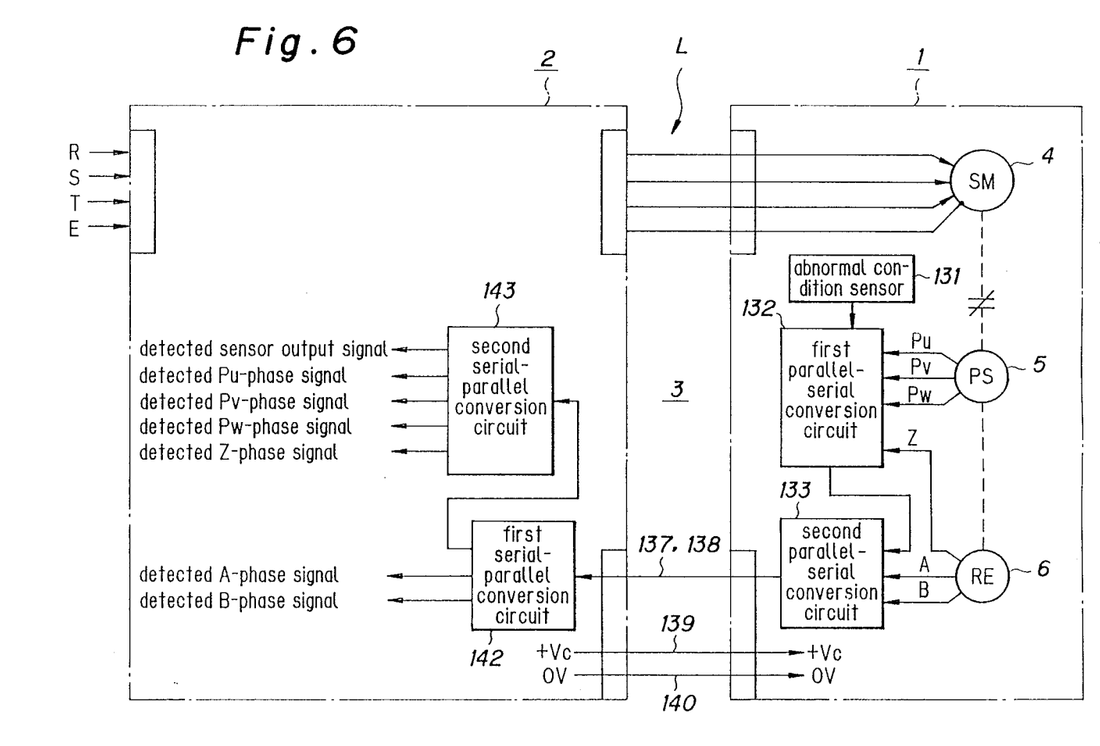
FIG. 6 is a circuit diagram showing a fourth embodiment of the present invention.

FIG. 6 shows a servo motor system including a signal transmission system according to a fourth embodiment of the present invention. A servo motor unit 1 is connected to a servo driver unit 2 via a plurality of signal transmission lines 3. The servo motor unit 1 includes a servo motor 4, a pole sensor 5 and a rotary encoder 6 which are mechanically coupled with the servo motor 4, an abnormal condition sensor 131, and first and second parallel-serial signal conversion circuits 132 and 133.

The pole sensor 5 detects the angular position of the magnetic poles in the servo motor 4 and supplies three-phase magnetic pole signals, or Pu-phase, Pv-phase and Pw-phase signals, to the first parallel-serial signal conversion circuit 132. The rotary encoder 6 is of an incremental type, and supplies A-phase and B-phase signals to the second parallel-serial signal conversion circuit 133, and a Z-phase signal to the first parallel-serial signal conversion circuit 132. The abnormal condition sensor 31 detects an abnormal condition of the servo motor 4, for instance an abnormal temperature increase thereof, and supplies a sensor output signal to the first parallel-serial signal conversion circuit 132.

Figure 7:
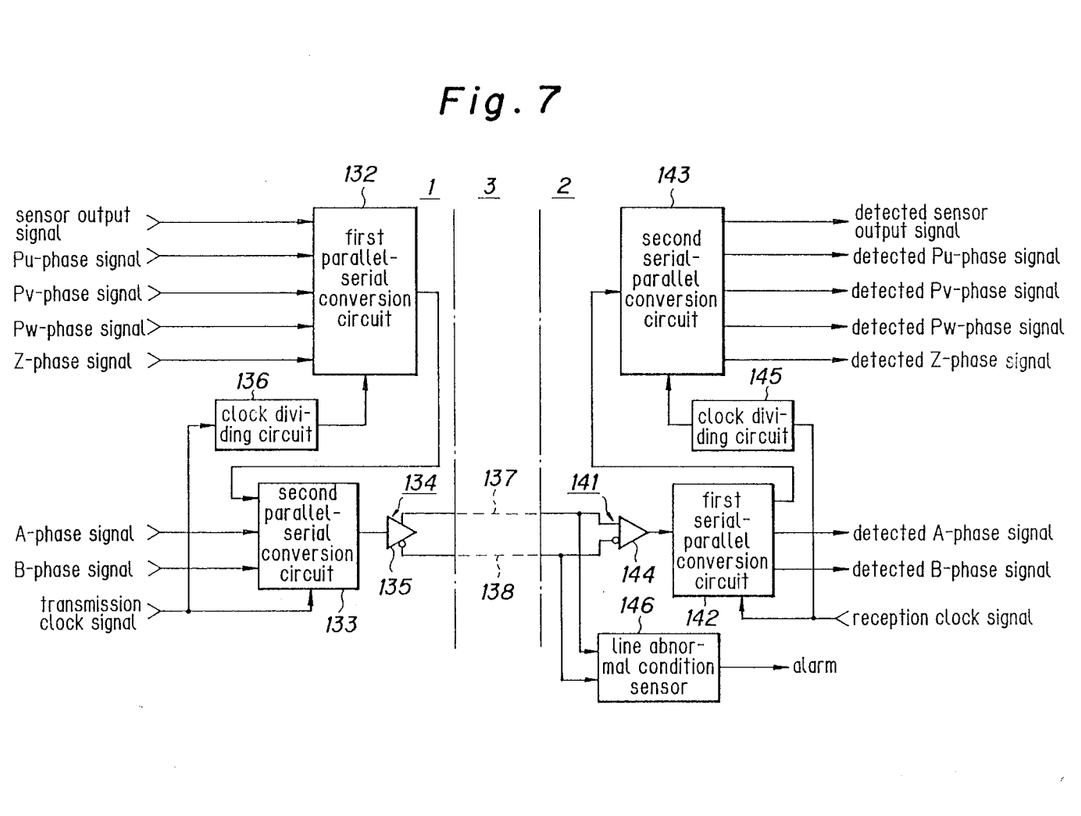
FIG. 7 is a circuit diagram showing a part of the fourth embodiment of the present invention.

The first parallel-serial signal conversion circuit 132 receives the Pu-phase, Pv-phase and Pw-phase signal, the Z-phase signals and the sensor output signal, and converts them into a corresponding serial signal which is given to the second parallel-serial signal conversion circuit 133, as shown in FIGS. 6 and 7. The second parallel-serial signal conversion circuit 133 converts the serial signal from the first parallel-serial signal conversion circuit 132, and the A-phase and B-phase signals into another serial signal which is transmitted to a line driver 135 of a signal transmission circuit unit 134 via the signal transmission lines 3. Referring to FIG. 7, a clock frequency divider circuit 136 divides a transmission clock signal and supplies its output to the first parallel-serial signal conversion circuit 132.

The signal transmission lines 3 include a pair of signal lines 137 and 138 for transmitting the serial signal from the servo motor unit 1 to the servo driver unit 2, another pair of signal lines 139 and 140 for sending +5 volt and 0 volt lines from the servo driver unit 2 to the servo motor unit 1. Thus, according to this embodiment, a significant reduction in the number of lines in the signal transmission lines 3 can be accomplished as compared with the related art illustrated in FIG. 10.

The servo driver unit 2 comprises a signal receiver circuit unit 141, and first and second serial-parallel signal conversion circuits 142 and 143. The signal receiver circuit unit 141 is provided with a line receiver 144 for receiving a serial signal, and passes the serial signal onto the first serial-parallel signal conversion circuit 142. The first serial-parallel signal conversion circuit 142 converts the serial signal into parallel signals which include detected A-phase and B-phase signals and another detected signal. The last mentioned detection signal is supplied to the second serial-parallel signal conversion circuit 143 which in turn produces detected Pu-phase, Pv-phase, Pw-phase and Z-phase signals as well as a detected abnormal condition signal. Referring to FIG. 7, the clock frequency divider circuit 145 divides the received clock signal and supplies its output to the serial-parallel signal conversion circuit 143 while a line abnormal condition detection circuit 146 produces a warning signal in case of the occurrence of an abnormal condition in the signal transmission lines 3, such as line breakage.

Figure 8:
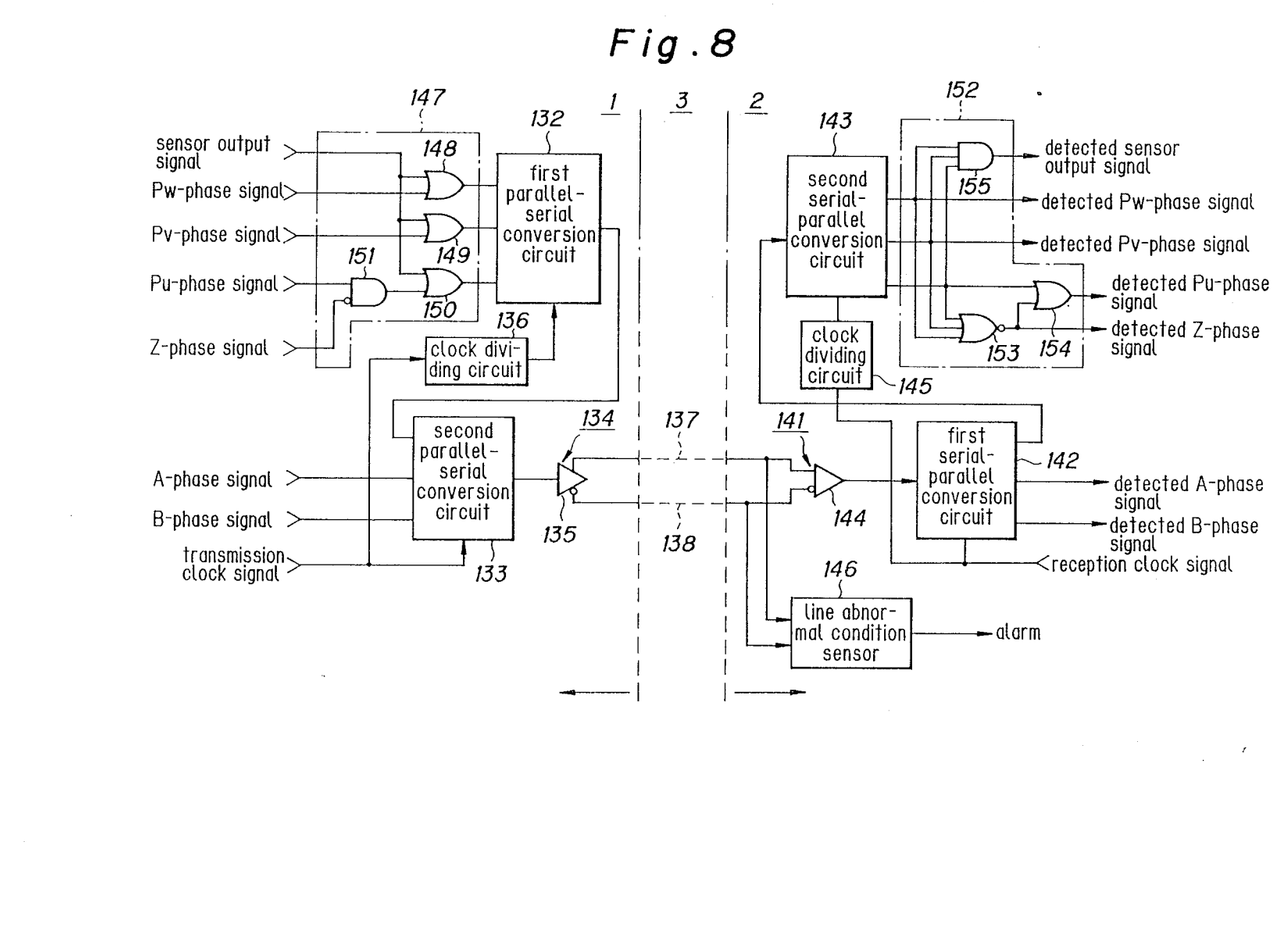
FIG. 8 is a circuit diagram showing a fifth embodiment of the present invention.
Figure 9:
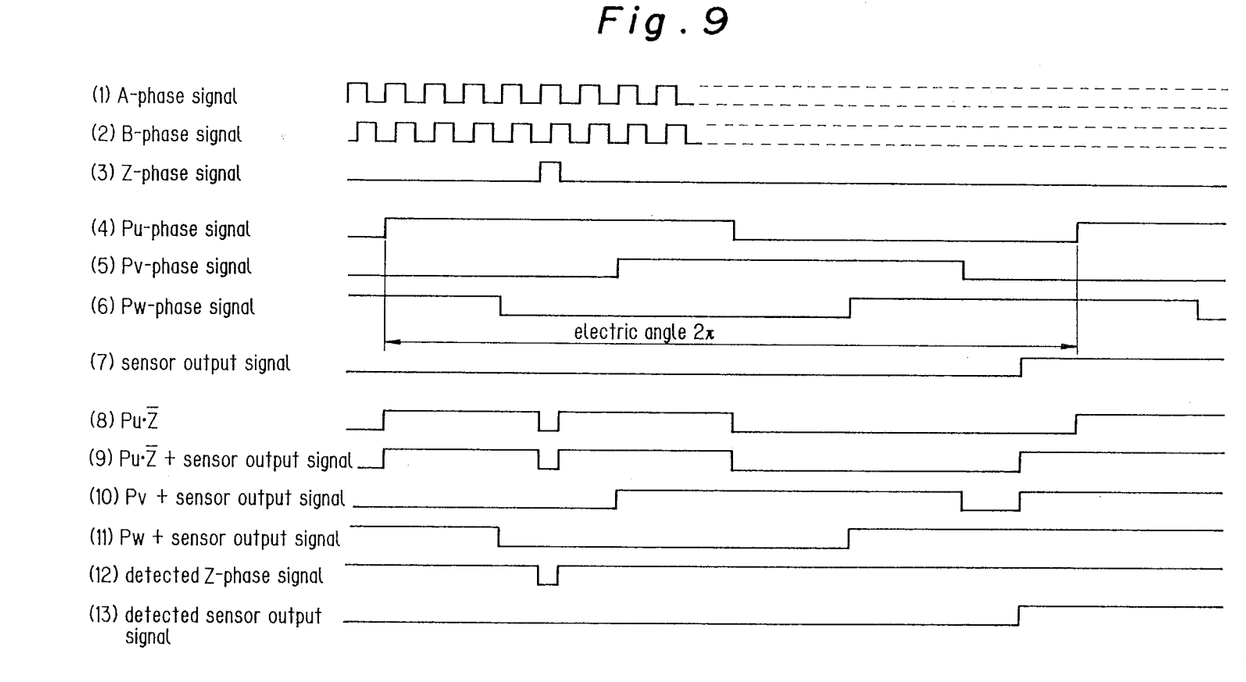
FIG. 9 is a time chart of the fifth embodiment of the present invention.

FIGS. 8 shows a fifth embodiment of the present invention and FIG. 9 shows a time chart of this embodiment.

This embodiment is constructed on the ground that the logical product of the Pu-phase, Pv-phase and Pw-phase signals is always zero (Pu.Pv.Pw=0), that their logical sum is always 1 (Pu+Pv+Pw=1), and that the results are not changed even when the Z-phase signals is added. The required number of lines in the signal transmission lines is reduced by two lines by taking advantage of the fact that the logical state is reversed when the sensor output signal is turned on. In this case, the detected Pu-phase, Pv-phase, Pw-phase and Z-phase signals are lost when an abnormal condition is detected in the servo motor unit 1, for instance due to an abnormal temperature increase, but this does not create any problem because the servo motor unit 1 is required to be stopped anyway in such a case.

Referring to FIG. 8, the servo motor unit 1 is provided with a logic circuit 147 including an AND circuit 151, and three OR circuits 148 through 150, and the logic circuit 147 receives the Z-phase signal (FIG. 9(3)), the Pu-phase signal (FIG. 9(4), the Pv-phase signal (FIG. 9(5)), the Pw-phase signal (FIG. 9(6)), and the sensor output signal FIG. 9(7). The Z-phase signal is produced when the Pu-phase signal is "1" and the Pv-phase signal and the Pw-phase signal are both "0", and the result of a logical multiplication between an inverted Z-phase signal and the Pu-phase signal (Pu $\bar{Z}$) is obtained from the output of the AND circuit 151 (FIG. 9(8)). A logical sum of the output of the AND circuit 151 and the sensor output signal (Pu.$\bar{Z}$+sensor output signal) is produced from the output of the OR circuit 150; a logical sum of the Pv-phase signal and the sensor output signal (Pv+sensor output signal) is obtained from the output of the OR circuit 151; and a logical sum of the Pw-phase signal and the sensor output signal (Pw+sensor output signal) is obtained from the output of the OR circuit 148. These logical sum outputs ((9) through (11) of FIG. 9) are converted into a serial signal by the first parallel-serial signal conversion circuit 132, and this serial signal along with the A-phase and B-phase signals is supplied to the second parallel-serial signal conversion circuit 133, and the obtained serial signal is supplied to the servo driver unit 2 via the line driver 135 of the signal transmission circuit unit 134 and the signal transmission lines 3.

The servo driver unit 2 receives this transmission signal at its line receiver 144, converts it into the A- phase and B-phase signals and the other detection signal, and the other detection signal is further supplied to the second serial-parallel signal conversion circuit 143 to be converted into parallel signals which are then given to the logic circuit 152.

The logic circuit 152 comprises a NOR circuit 153, an OR circuit 154, and an AND circuit 155. The NOR circuit 53 receives the demodulated logical sum signals ($Pu.\bar{Z}$+sensor signal), (Pv+sensor output signal), and (Pw+sensor output signal), and produces a detected Z-phase signal (FIG. 9(12)). The OR circuit 154 receives the output of the NOR circuit 153 and the logical sum signal ($Pu.\bar{Z}$+sensor output signal), and produces a detected Pu-phase signal. On the other hand, the logical sum signals (Pv+sensor output signal) and (Pw+sensor output signal) are simply used as a detected Pv-phase signal and a detected Pu-phase signal, respectively. The AND circuit 155 receives the logical sum signals ($Pu.\bar{Z}$+sensor output signal), (Pv+sensor output signal), and (Pw+sensor output signal), and produces an abnormal condition detection signal when the logical product of the three inputs is found to be "1" (FIG. 9(13)).

When the servo motor unit 1 is activated, the A-phase and B-phase signals from the rotary encoder 6 are supplied to the second parallel-serial signal conversion circuit 133, and the Z-phase signal of the rotary encoder 6, the Pu-phase, Pv-phase and Pw-phase signals of the pole sensor 5, and the sensor output signal of the abnormal condition sensor 131 are supplied to the first parallel-serial signal conversion circuit 132. The first parallel-serial signal conversion circuit 132 converts the Z-phase signal, the Pu-phase, Pv-phase and Pw-phase signals, and the sensor output signal into a serial signal which is in turn supplied to the second parallel-serial signal conversion circuit 133, along with the A-phase and B-phase signals, to be converted into another serial signal. This final serial signal is sent to the line driver 135 of the signal transmission circuit unit 134, and is ultimately sent to the line receiver 144 of the signal receiver circuit unit 141 in the servo driver unit 2 via the signal transmission lines 3. Thereafter, the received signal is supplied to the first and second serial-parallel signal conversion circuits 142 and 143 in that order, and the detected A-phase and B-phase signals are produced from the first serial-parallel signal conversion circuit 142 while the Z-phase signal, the Pu-phase, Pv-phase and Pw-phase signals, and the sensor output signal are produced from the second serial-parallel signal conversion circuit 143.

Thus, according to the fourth and fifth embodiments of the present invention, since the Z-phase signal from the rotary encoder, the pole detection signals from the pole sensor and the sensor output signal from an abnormal condition sensor are first converted into a first serial signal, and the first serial signal, and the A-phase and B-phase signals of the rotary encoder are then converted into a second serial signal which is ultimately transmitted through the signal transmission lines, an even more significant reduction in the number of the signal transmission lines can be accomplished without requiring any unduly high quality signal transmission lines. Furthermore, in this embodiment also, the number of bits which are required to be transmitted can be reduced by a favorable arrangement of logical circuit in association withe the parallel-serial and serial-parallel signal conversion circuits.

What we claim is:

1. A servo motor system, comprising a servo motor unit, a servo driver unit, power transmission lines for supplying electric power from said servo driver unit to said servo motor unit, and signal transmission lines for supplying electric signals from said servo motor unit to said servo driver unit, wherein:
    said servo motor unit comprises: a servo motor; a pole sensor for detecting a magnetic state of said servo motor; a rotary encoder for detecting a mechanical state of said servo motor; a parallel-serial signal conversion circuit for converting an output from said pole sensor and an output from said rotary encoder into a single serial signal; and a line driver for sending out said serial signal through one of said signal transmission lines: and
    said servo driver unit comprises: a line receiver for receiving said serial signal transmitted from said line driver through said signal transmission line; a serial-parallel signal conversion circuit for separating said output signals from said rotary encoder and said pole sensor from said serial signal, and a controller for controlling supply of electric power to said servo motor unit through said power transmission lines according to said separated parallel signals.

2. A servo motor system according to claim 1, wherein said servo motor comprises a three-phase AC motor, and said outputs from said pole sensor and said rotary encoder include Pu-phase, Pv-phase and Pw-phase signals from said pole sensor and a Z-phase signal from said rotary encoder.

3. A servo motor system according to claim 2, wherein said servo motor unit further comprises a motor abnormal condition sensor for detecting an abnormal condition of said servo motor unit, and an output signal from said motor abnormal condition sensor is supplied to said parallel-serial signal conversion circuit to be included in said serial signal and to be separated from said serial signal by said serial-parallel signal conversion circuit.

4. A servo motor system according to claim 3, wherein a driver logic circuit comprising three AND circuits is connected to the input ends of said parallel-serial signal conversion circuit, said Pu-phase, Pv-phase and Pw-phase signals being each supplied to an input end of associated one of said AND circuits whose other ends are commonly connected to receive said sensor output signal while said Z-phase signal is directly supplied to one of the inputs of said parallel-serial signal conversion circuit; and a motor logic circuit comprising a NOR circuit is connected to the output ends of said serial-parallel signal conversion circuit, detected Pu-phase, Pv-phase and Pw-phase signals separated from said serial-parallel signal conversion circuit being supplied to different input ends of said NOR circuit so as to produce an abnormal condition detection signal from an output end of said NOR circuit in case an abnormal condition is detected by said abnormal condition sensor while a detected Z-phase signal is directly obtained from one of said output ends of said serial-parallel signal conversion circuit.

5. A servo motor system according to claim 3, wherein a driver logic circuit comprising one AND circuit and three OR circuits is connected to the input ends of said parallel-serial signal conversion circuit, said Pu-phase signal and said Z-phase signal being supplied to different input ends of said AND circuit while an output of said AND circuit, and said Pv-phase and Pw-phase signals are each supplied to an input end of associated one of said OR circuits whose other ends are commonly connected to receive said sensor output signal; and a motor logic circuit comprising a NOR circuit, an AND circuit and an OR circuit is connected to the output ends of said serial-parallel signal conversion circuit, three outputs from said serial-parallel signal conversion circuit being connected to different inputs of said NOR circuit as well as to different inputs of said AND circuit while an output of said NOR circuit and one of said output ends of said serial-parallel signal conversion circuit being connected to different inputs of said OR circuit so that a detected Z-phase signal, a detected Pu-phase signal and a detected sensor output signal may be obtained from said output end of said NOR circuit, an output end of said OR circuit and an output end of said AND circuit, respectively, while detected Pv-phase and Pw-phase signals may be obtained directly from associated ones of said output ends of said serial-parallel signal conversion circuit.

6. A servo motor system, comprising a servo motor unit, a servo driver unit, power transmission lines for supplying electric power from said servo driver unit to said servo motor unit, and signal transmission lines for supplying electric signals from said servo motor unit to said servo driver unit, wherein:

said servo motor unit comprises: a three-phase AC servo motor; a pole sensor for detecting a magnetic state of said servo motor and supplying Pu-phase, Pv-phase and Pw-phase signals; a rotary encoder for detecting a mechanical state of said servo motor and supplying a Z-phase signal; a parallel-serial signal conversion circuit for converting said Pu-phase, Pv-phase and Pw-phase signals from said pole sensor and said Z-phase signal from from said rotary encoder into a single serial signal; and a line driver for sending out said serial signal through one of said signal transmission lines: and said servo driver unit comprises: a line receiver for receiving said serial signal transmitted from said line driver through said signal transmission line; a serial-parallel signal conversion circuit for separating, from said serial signal, detected Pu-phase, Pv-phase, Pw-phase and Z-phase signals, and a controller for controlling supply of electric power to said servo motor unit through said power transmission lines according to said separated parallel signals.

7. A servo motor system, comprising a servo motor unit, a servo driver unit, power transmission lines for supplying electric power from said servo driver unit to said servo motor unit, and signal transmission lines for supplying electric signals from said servo motor unit to said servo driver unit, wherein:

said servo motor unit comprises: a three-phase AC servo motor; a pole sensor for detecting a magnetic state of said servo motor and supplying Pu-phase, Pv-phase and Pw-phase signal; a rotary encoder for detecting a mechanical state of said servo motor and supplying a Z-phase signal; a first parallel-serial signal conversion circuit for converting said Pu-phase, Pv-phase and Pw-phase signals from said pole sensor and said Z-phase signal from from said rotary encoder into a first serial signal; a second parallel-serial signal conversion circuit for converting said first serial signal and A-phase and B-phase signals from said rotary encoder into a second serial signal; and a line driver for sending out said second serial signal through one of said signal transmission lines: and said servo driver unit comprises: a line receiver for receiving said second serial signal transmitted from said line driver through said signal transmission line; a first serial-parallel signal conversion circuit for separating, from said second serial signal, a detected serial signal and detected A-phase and B-phase signals; a second serial-parallel signal conversion circuit for separating, from said detected first serial signal, detected Pu-phase, Pv-phase, Pw-phase and Z-phase signals, and a controller for controlling supply of electric power to said servo motor unit through said power transmission lines according to said separated parallel signals.

8. A servo motor system according to claim 7, wherein said servo motor unit further comprises a motor abnormal condition sensor for detecting an abnormal condition of said servo motor unit, and an output signal from said motor abnormal condition sensor is supplied to said first parallel-serial signal conversion circuit to be included in said first serial signal and to be separated from said detected first serial signal by said second serial-parallel signal conversion circuit as a detected abnormal condition signal.

9. A servo motor system according to claim 8, wherein a driver logic circuit comprising an AND circuit and three OR circuits is connected to the input ends of said first parallel-serial signal conversion circuit, said Pu-phase signal and said Z-phase signal being supplied to different input ends of said AND circuit while an output of said AND circuit, and said Pv-phase and Pw-phase signals are each supplied to an input end of associated one of said OR circuits whose other ends are commonly connected to receive said sensor output signal; and a motor logic circuit comprising a NOR circuit, an AND circuit and an OR circuit is connected to the output ends of said second serial-parallel signal conversion circuit, three outputs from said second serial-parallel signal conversion circuit being connected to different inputs of said NOR circuit as well as to different inputs of said AND circuit while an output of said NOR circuit and one of said output ends of said second serial-parallel signal conversion circuit being connected to different inputs of said OR circuit so that a detected Z-phase signal, a detected Pu-phase signal and a detected sensor output signal may be obtained from said output end of said NOR circuit, and output end of said OR circuit and an output end of said AND circuit, respectively, while detected Pv-phase and Pw-phase signals may be obtained directly from associated ones of said output ends of said second serial-parallel signal conversion circuit.

* * * * *